US008866629B2

(12) United States Patent
Anderson et al.

(10) Patent No.: US 8,866,629 B2
(45) Date of Patent: Oct. 21, 2014

(54) BUILT-IN AUTOMATED ELECTROSTATIC DISCHARGE MONITOR FOR COMPUTING UNITS

(75) Inventors: Paul L. Anderson, Wake Forest, NC (US); Anouar Braham, Tunisia (AF); Tu T. Dang, Cary, NC (US); Michael C. Elles, Apex, NC (US); Ketan B. Patel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 13/100,339

(22) Filed: May 4, 2011

(65) Prior Publication Data

US 2012/0283971 A1    Nov. 8, 2012

(51) Int. Cl.
*G08B 21/00* (2006.01)
*G06F 11/30* (2006.01)
*G06F 11/07* (2006.01)
*G06F 11/32* (2006.01)

(52) U.S. Cl.
CPC ........ *G06F 11/0787* (2013.01); *G06F 11/3072* (2013.01); *G06F 11/3058* (2013.01); *G06F 11/327* (2013.01); *G06F 11/0748* (2013.01)
USPC ............................ 340/649; 340/650; 340/657

(58) Field of Classification Search
CPC ....... G01R 29/12; G01R 31/025; G01R 27/18
USPC ......................................................... 340/649
See application file for complete search history.

(56) References Cited

U.S. PATENT DOCUMENTS

| 4,600,962 | A | 7/1986 | Bliehall |
| 5,422,630 | A | 6/1995 | Quinn et al. |
| 5,719,502 | A | 2/1998 | Verbiest et al. |
| 6,052,053 | A | 4/2000 | Jubin et al. |
| 6,205,408 | B1 | 3/2001 | Jubin et al. |
| 6,510,987 | B1 | 1/2003 | Hengriprasopchoke et al. |
| 6,563,319 | B1 | 5/2003 | Kraz |
| 6,785,111 | B1 * | 8/2004 | Osborne ........................ 361/152 |
| 6,930,612 | B1 * | 8/2005 | Kraz et al. ..................... 340/649 |
| 7,038,279 | B2 * | 5/2006 | Kraz et al. ..................... 257/355 |
| 7,353,120 | B2 | 4/2008 | Enta |
| 7,764,184 | B2 | 7/2010 | Dobbs et al. |
| 7,795,875 | B2 | 9/2010 | Kraz |

OTHER PUBLICATIONS

EM Aware ESD Event Monitors; Credence Technologies; 1999; 1 page.

(Continued)

*Primary Examiner* — Kerri McNally
(74) *Attorney, Agent, or Firm* — Brown & Michaels, PC; John R. Pivnichny

(57) ABSTRACT

A method, computer program product, and computer system for monitoring for electrostatic discharge (ESD) events. An ESD monitor for potential of electrostatic discharge events in a sensed area through a plurality of ESD sensors coupled to the ESD monitor. The monitor senses for a charge level which could cause ESD event and entry of an operator into a sensed area. If an ESD event is detected, issue an ESD event alert to the operator and recording data to a tangible storage device; determine environmental factors at time and date of the ESD event; compare the ESD event and associated environmental factors to other ESD events with associated environmental factors; and determine if a correlation exists between the ESD event and associated environmental factors and the other ESD events with associated environmental factors.

25 Claims, 4 Drawing Sheets

(56) References Cited

OTHER PUBLICATIONS

EMAlert—Series EMI Protection Modules; Credence Technologies, Inc.; 2000; 4 pages.

EMAlert—The Last Line of Defence Against EMI; Credence Technologies, Inc.; 1997; 6 pages.

ESD: The Discharge Part of Electrostatic Discharge; Credence Technologies, Inc.; 2000; 33 pages.

* cited by examiner

BUILT-IN AUTOMATED ELECTROSTATIC DISCHARGE MONITOR FOR COMPUTING UNITS

TECHNICAL FIELD

The present invention relates to built-in electrostatic discharge (ESD) monitors and more specifically to a built-in automated ESD monitor for a group of computing units.

BACKGROUND

Any microelectronic and electrical system, equipment or device can be damaged by electrostatic discharge. There are two different categories of ESD damage, catastrophic damage and latent damage. Devices that undergo catastrophic damage are instantly destroyed at the time of an ESD event, while devices that undergo latent damage have been weakened by an ESD event that may lead to future failures.

In conjunction with other ESD precautions, an ESD wrist strap—an antistatic device used to safely ground a user working on electric equipment is commonly used when servicing hardware to prevent static electricity on the user's body which can result in ESD. The wrist straps are often placed in inconvenient locations surrounding the equipment to be serviced and may not function properly.

SUMMARY

According to one embodiment of the present invention is a method of monitoring for electrostatic discharge events. The method includes the steps of: a computer monitoring for potential electrostatic discharge events and entry of an operator into a sensed area; if a potential electrostatic discharge event is detected by the computer, the computer, then issuing an electrostatic discharge event alert to the operator and recording data to a tangible storage device; determining environmental factors at time and date of the electrostatic discharge event; comparing the electrostatic discharge event and associated environmental factors to other electrostatic discharge events with associated environmental factors; and determining if a correlation exists between the electrostatic discharge event and associated environmental factors and the other electrostatic discharge event with associated environmental factors.

According to another embodiment of the present invention, a computing unit including: a chassis; at least one individual hardware unit received by the chassis; an electrostatic discharge monitor for potential of electrostatic discharge events electrostatic discharge events in a sensed area; and a plurality of electrostatic discharge sensors coupled to the electrostatic discharge monitor. The electrostatic discharge monitor includes one or more processors, one or more computer-readable memories and one or more computer-readable, tangible storage devices; program instructions, stored on at least one of the one or more storage devices for execution by at least one of the one or more processors via at least one of the one or more memories to monitor for potential of electrostatic discharge events and entry of an operator into a sensed area; and program instructions, stored on at least one of the one or more storage devices for execution by at least one of the one or more processors via at least one of the one or more memories wherein if an electrostatic discharge event is detected: issue an electrostatic discharge event alert to the operator and record data to a tangible storage device; determine environmental factors at time and date of the electrostatic discharge event; compare the electrostatic discharge event and associ-ated environmental factors to other electrostatic discharge events with associated environmental factors; and determine if a correlation exists between the electrostatic discharge event and associated environmental factors and the other electrostatic discharge event with associated environmental factors.

According to another embodiment of the present invention, a computer system for monitoring for electrostatic discharge events, the computer system comprising: one or more processors, one or more computer-readable memories and one or more computer-readable, tangible storage devices; program instructions, stored on at least one of the one or more storage devices for execution by at least one of the one or more processors via at least one of the one or more memories to monitor for potential of electrostatic discharge events and entry of an operator into a sensed area; and program instructions, stored on at least one of the one or more storage devices for execution by at least one of the one or more processors via at least one of the one or more memories wherein if an electrostatic discharge event is detected: issue an electrostatic discharge event alert to the operator and recording data to a tangible storage device; determine environmental factors at time and date of the electrostatic discharge event; compare the electrostatic discharge event and associated environmental factors to other electrostatic discharge events with associated environmental factors; and determine if a correlation exists between the electrostatic discharge event and associated environmental factors and the other electrostatic discharge event with associated environmental factors.

According to an embodiment of the present invention, a computer system for monitoring for electrostatic discharge events, the computer system comprising: one or more processors, one or more computer-readable memories and one or more computer-readable, tangible storage devices; program instructions, stored on at least one of the one or more storage devices for execution by at least one of the one or more processors via at least one of the one or more memories to monitor for potential of electrostatic discharge events and entry of an operator into a sensed area; and program instructions, stored on at least one of the one or more storage devices for execution by at least one of the one or more processors via at least one of the one or more memories wherein if an electrostatic discharge event is detected: issue an electrostatic discharge event alert to the operator and recording data to a tangible storage device; determine environmental factors at time and date of the electrostatic discharge event; compare the electrostatic discharge event and associated environmental factors to other electrostatic discharge events with associated environmental factors; and determine if a correlation exists between the electrostatic discharge event and associated environmental factors and the other electrostatic discharge event with associated environmental factors.

DETAILED DESCRIPTION

Figure 1:
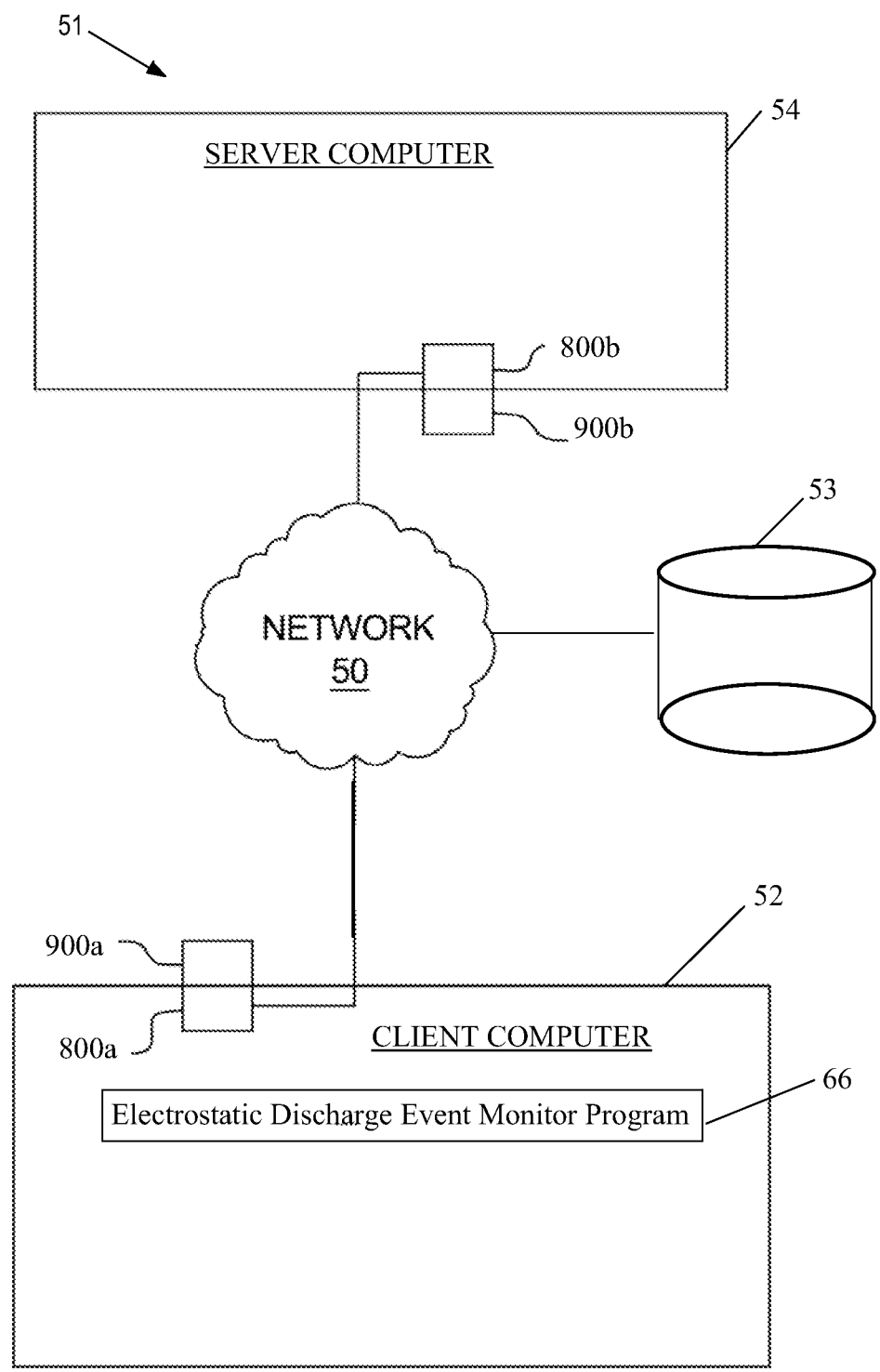
FIG. 1 depicts a pictorial representation of a network of data processing systems in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52 and computer 54 connect to network 50. Client computer 52 includes a set of internal components 800a and external components 900a illustrated in FIG. 8. Client computer 52 may be, for example a mobile device a cell phone, a personal digital assistant, a netbook, a laptop computer, a tablet computer, a desktop computer, or any other type of computing device.

Server computer 54 includes a set of internal components 800b and external components 900b illustrated in FIG. 8.

In the depicted example, server 54 provides information, such as boot files, operating system images, and applications to a client computer 52. The information can be computed locally or extracted from other computers on the network 50.

Network data processing system 51 may include additional computer servers 54 and client workstations 52, and other devices not shown. For example a tangible storage device.

Program code and programs such as a ESD event monitor program 66 may also be located in network data processing system 51 and may be stored on one or more computer-readable tangible storage devices 830 shown in FIG. 8, one or more portable computer-readable tangible storage devices 936 as shown in FIG. 8, in tangible storage device 53 connected to the network 52, or downloaded to a data processing system or other device for use. For example, program code, and programs such as ESD event monitor program 66 may be stored on one or more tangible storage device 830 on server computer 54 and downloaded to client computer 52 over network 50 for use on client computer 52. In other exemplary embodiments, the program code and programs such as ESD event monitor program 66 may be stored on one or more computer-readable tangible storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
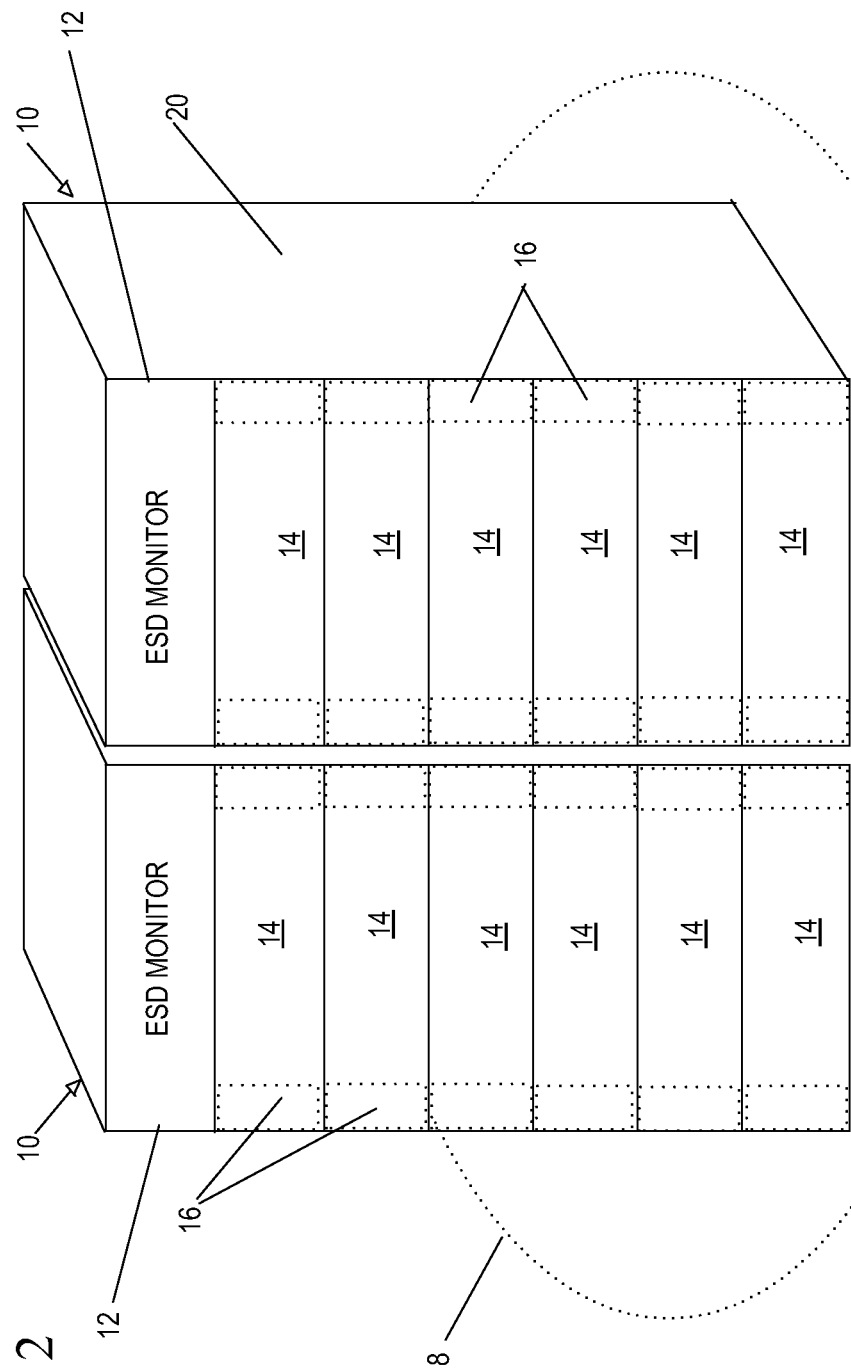
FIG. 2 shows computing units with a built-in ESD monitor of an embodiment of the present invention.

FIG. 2 shows an example of computing units 10 stored in a data center. The computing unit 10 may include at least one server 54 as shown in FIG. 1. While two individual computing units 10 are shown, any configuration of computing units may be used, for example a stand alone computing unit, a group of units, or a rack with individual hardware units. The computing units 10 are connecting to ground within a building in which they are housed.

Figure 4:
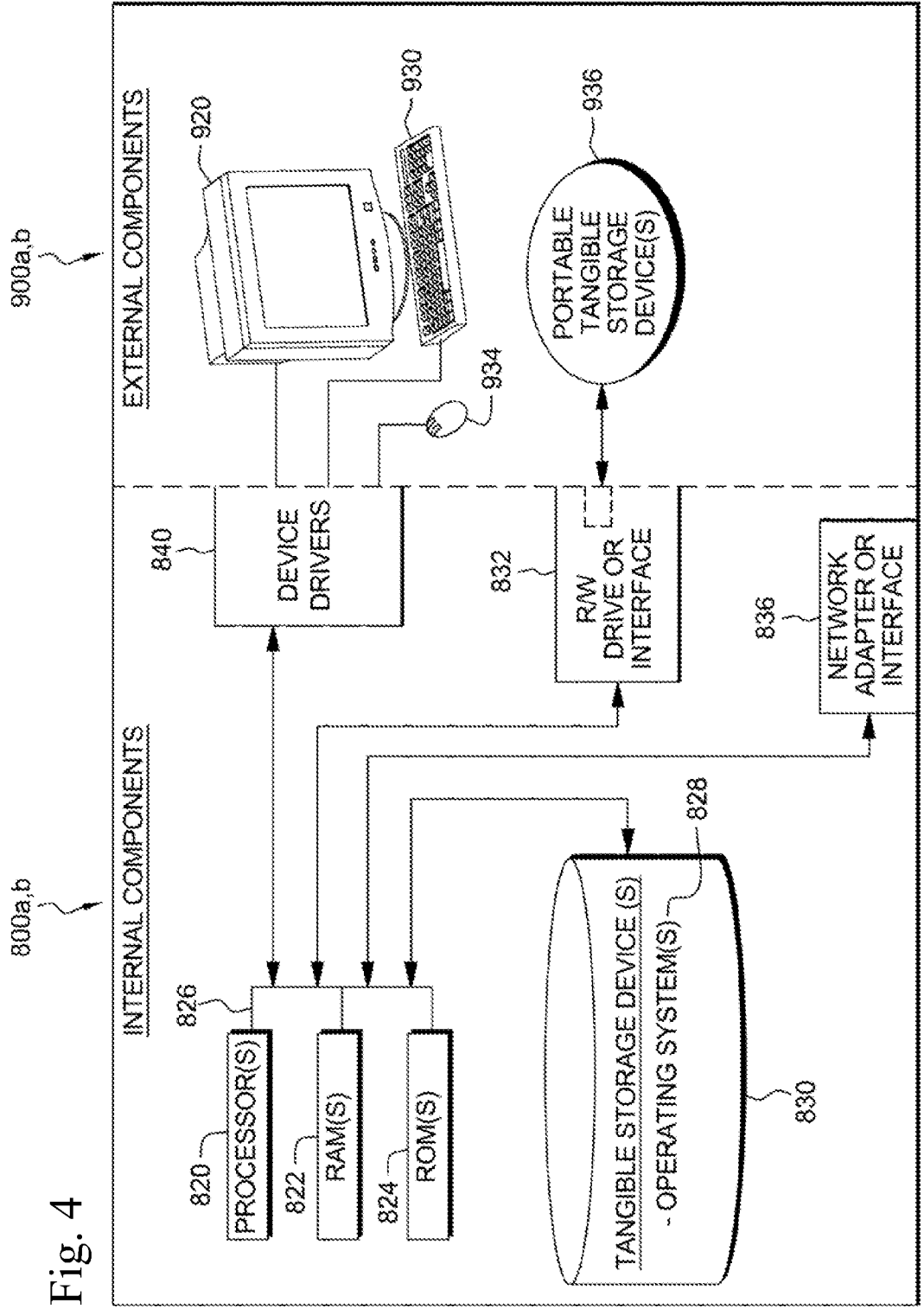
FIG. 4 illustrates internal and external components of a client computer and a server computer in which illustrative embodiments may be implemented.

The computing units 10 all preferably include a computer chassis or rack 20 enclosing or semi-enclosing any individual hardware units 14. The individual hardware units 14 may be servers, such as servers 54 as shown in FIG. 1, tangible storage devices such as 830, 936 as shown in FIG. 4, power supplies, security devices, or other electrical components.

Within the computing unit 10 is a built-in electrostatic discharge (ESD) monitor 12 that monitors ESD events, ground potential, electrostatic discharge and entry in close proximity to all of the individual hardware units 14 and the computing unit 10 itself. The ESD monitor 12 may be a client workstation 52 as shown in FIG. 1 and includes internal and external components 800a, 900a as shown in FIG. 4.

An ESD event is an event in which the ESD monitor 12 detects a new source of electromagnetic field and the strength of the electromagnetic field is elevated to or beyond a specified level. In an embodiment of the present invention, the ESD monitor 12 and the computing units 10 are maintained at the same ground potential. The ESD monitor 12 monitors the ground potential or voltage between the computing unit 10, an operator/user, and other control equipment within a predefined distance to determine whether the current to ground is different and above a specific level and therefore an ESD event. Alternate methods of determining an ESD event may also be employed without deviating from the scope of the invention. Additionally, the ESD monitor also detects any entry a certain distance from a predefined proximity to the computing unit 10 and/or the individual hardware 14 of the computing unit 10.

The internal components 800a of the ESD monitor 12 may interact with electrostatic sensors 16 and the tangible storage device(s) 830 to store and receive information regarding ESD alerts which include ESD event alerts and entry alerts. The ESD monitor 12 also includes a single or multi retractable ESD wrist strap(s) (not shown).

The electrostatic sensors 16 preferably sense electrostatic charge a specific distance from the sensor. The distance may vary from less than half an inch to one foot. The electrostatic sensors 16 are preferably placed on touch points of the individual hardware units and entrance to the computer chassis, and can sense up to a specific distance from the computing unit, establishing a perimeter 18.

In one embodiment, the electrostatic sensors 16 sense an area within 0.5 inches of the touch points used to remove the individual computing units 14 from the computer chassis 20. When an operator attempts to grasp the touch points, an entry alert is issued by the ESD monitor 12 through the ESD event monitor program 66 to remind the operator to follow ESD procedure prior to removing the individual computing units 14. Furthermore, each time an operator opens the computer chassis 20 of a computing unit 10, an entry alert is issued by the ESD monitor 12 through the ESD event monitor program 66 to the operator to follow ESD procedure prior to opening the computing unit 10.

When an operator has built up charge on their body beyond a specified point and attempts to grasp the touch points of individual computing units 14 or the chassis 20, an ESD event alert is issued by the ESD event monitor program 66.

In another embodiment, the ESD monitor 12 may also be incorporated directly into the individual hardware units 14 of the computing unit 10. The ESD monitors 12 in each of the individual hardware units 14 may operate individually or each can be further monitored by a central ESD monitor and ESD alerts are issued as necessary.

Figure 3:
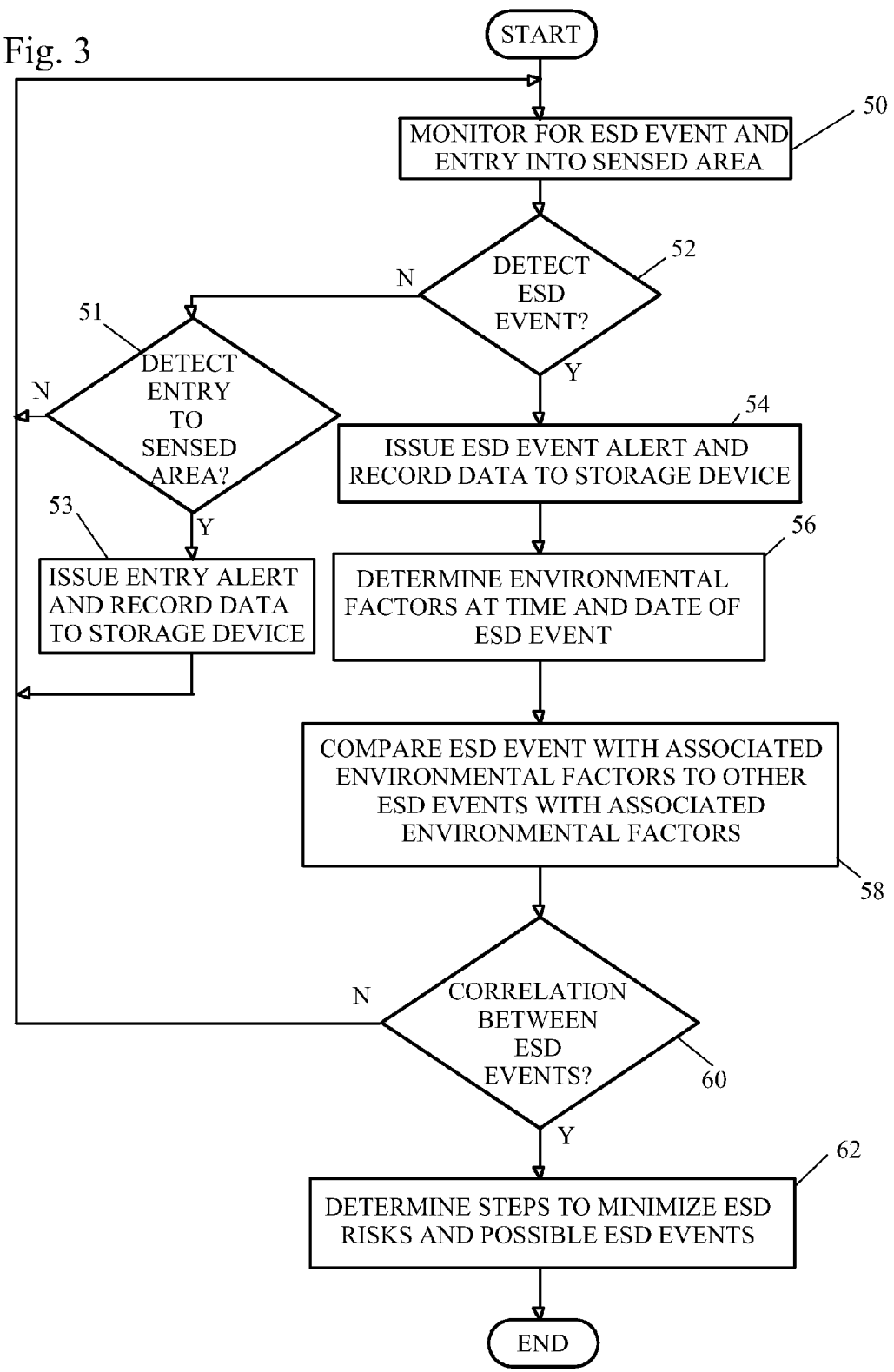
FIG. 3 shows a method of monitoring ESD events, storing, and analyzing potential and actual ESD events.

FIG. 3 shows a flowchart of a method of monitoring and correlating ESD events with environmental factors according to an illustrative embodiment. It will be understood that, in one exemplary embodiment, each block or combination of blocks shown in FIG. 3 can be implemented by program instructions of the ESD event monitor program 66 shown in FIG. 4, which can be stored on tangible storage devices 830 of FIG. 4 and can be executed by processor 820 of FIG. 4.

Referring to FIG. 3, the ESD monitor 12 monitors for ESD events and entry into a sensed area using ESD sensors (step 50). If an ESD event is not detected (step 52), and entry into a sensed area is not detected (step 51), continue to monitor for ESD events (step 50).

If an ESD event is not detected (step 52) and entry into a sensed area is detected (step 51), issue an entry alert to at least an operator and record data to a tangible storage device (step 53) and then continue to monitor for ESD events (step 50). The alert issued due to entry detection in step 53 may be stored in the same storage device as in step 52, for example tangible storage device 830 or portable tangible storage device 936 and is preferably stored as separate entries from the detected ESD events in step 54. The alert may be a sound, blinking light, or any other stimulation to alert an operator.

If an ESD event is detected (step 52), the ESD event monitor program 66 of the ESD monitor 12 issues an ESD event alert to an operator and records information regarding the ESD event to a storage device (step 54), for example tangible storage device 830 or portable tangible storage device 936. The information that may be recorded may include, but is not limited to, date and time of the ESD event, assessed damage to the equipment—which may be done by an operator or by a computer, and equipment serial number, type, make and model.

The alert may be a sound, blinking light, or any other stimulation to alert an operator. The alert may not only be issued to an operator in the physical presence of the computing unit 10, but also to an operator present in a location other than the immediate location of the computing unit 10.

A computer determines environmental factors at the time and date of the recorded ESD event (step 56). Environmental factors include, but are not limited to weather, weather patterns, temperature, humidity, and the operators themselves who service the computing units. The computer or operator may access databases, internal monitoring of the building and other sources of information to determine the environmental factors associated with a particular ESD event.

A computer than compares the ESD event with associated environmental factors to other ESD events with their associated environmental factors (step 58). If a correlation is found between ESD events (step 60), an operator is notified and determines steps to minimize ESD risks, the root causes of the ESD events, and to prevent future possible ESD events (step 62). If a correlation is not found (step 60), return to monitoring for an ESD event (step 50).

FIG. 4 illustrates internal and external components of client computer 52 and server computer 54, in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and search model programs 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. ESD event monitor program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. The ESD event monitor program 66 can be downloaded to computer 52 and server computer 54 from an external computer via a network (for example, the Internet, a local area network or other, wide area network) and network adapter or interface 836, ESD event monitor program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 940. Each of the sets of internal components 800a, 800b also includes device drivers 840 to interface to computer display monitor 920, keyboard 930 and computer mouse 940. The device drivers 840, R/W drive or interface 832 and network adapter or interface 836 comprise hardware and software (stored in storage device 830 and/or ROM 824).

ESD event monitor program 66 can be written in various programming languages including low-level, high-level, object-oriented or non object-oriented languages. Alternatively, the functions of ESD event monitor program 66 can be implemented in whole or in part by computer circuits and other hardware (not shown).

Based on the foregoing, a computer system, method and program product have been disclosed for monitoring for ESD events. However, numerous modifications and substitutions can be made without deviating from the scope of the present invention. Therefore, the present invention has been disclosed by way of example and not limitation.

What is claimed is:

1. A method of monitoring for electrostatic discharge events, the method comprising the steps of:
   a computer monitoring for potential electrostatic discharge events and entry of an operator into a sensed area;
   if a potential electrostatic discharge event is detected by the computer upon entry of the operator into the sensed area, the computer:
      issuing an electrostatic discharge event alert to the operator and recording data to a tangible storage device;
      determining environmental factors at time and date of the potential electrostatic discharge event;

comparing the potential electrostatic discharge event and associated environmental factors to other electrostatic discharge events with associated environmental factors; and determining if a correlation exists between the potential electrostatic discharge event and associated environmental factors and the other electrostatic discharge events with associated environmental factors; and if the electrostatic discharge event is not detected by the computer upon entry of the operator into sensed area, the computer issuing an issue entry alert to the operator, reminding the operator to follow electrostatic discharge protocol and recording data of the entry alert to the tangible storage device.

2. The method of claim 1, wherein the environmental factors are selected from a group consisting of weather, weather patterns, humidity, temperature, and operators of equipment.

3. The method of claim 1, wherein the recorded data to the tangible storage device includes at least date and time of the electrostatic discharge event.

4. The method of claim 3, wherein the recorded data to the tangible storage device further comprises equipment serial number, type of equipment, make and model of the equipment and assessed damage to the equipment.

5. The method of claim 1, wherein if the computer determines a correlation exists between the potential electrostatic discharge event and associated environmental factors and the other electrostatic discharge events with associated environmental factors, the method further comprises an operator determining steps to minimize electrostatic discharge risks and electrostatic discharge events.

6. A computer program product comprising one or more computer-readable, tangible storage devices and computer-readable program instructions which are stored on the one or more storage devices and when executed by one or more processors, perform the method of claim 1.

7. A computing unit comprising:
a chassis;
at least one individual hardware unit received by the chassis;
an electrostatic discharge monitor for potential of electrostatic discharge events in a sensed area;
a plurality of electrostatic discharge sensors coupled to the electrostatic discharge monitor;
the electrostatic discharge monitor comprising:
one or more processors, one or more computer-readable memories and one or more computer-readable, tangible storage devices;
program instructions, stored on at least one of the one or more storage devices for execution by at least one of the one or more processors via at least one of the one or more memories to monitor for potential of electrostatic discharge events and entry of an operator into a sensed area;
program instructions, stored on at least one of the one or more storage devices for execution by at least one of the one or more processors via at least one of the one or more memories wherein if an operator enters into the sensed area and an electrostatic discharge event is detected:
issue an electrostatic discharge event alert to the operator and record data to a tangible storage device;
determine environmental factors at time and date of the potential electrostatic discharge event;
compare the potential electrostatic discharge event and associated environmental factors to other electrostatic discharge events with associated environmental factors; and determine if a correlation exists between the potential electrostatic discharge event and associated environmental factors and the other electrostatic discharge events with associated environmental factors; and if the electrostatic discharge event is not detected by the computer upon entry of the operator into sensed area, program instructions, stored on at least one of the one or more storage devices for execution by at least one of the one or more processors via at least one of the one or more memories to issue an issue entry alert to the operator, reminding the operator to follow electrostatic discharge protocol and recording data of the entry alert to the tangible storage device.

8. The computing unit of claim 7, wherein the electrostatic discharge sensors are on the chassis.

9. The computing unit of claim 7, wherein the electrostatic discharge sensors are integral to the at least one individual hardware unit.

10. The computing unit of claim 7, wherein the sensed area is within a range of 0.5 inches to one foot.

11. The computing unit of claim 7, wherein the environmental factors are selected from a group consisting of weather, weather patterns, humidity, temperature, and operators of equipment.

12. The computing unit of claim 7, wherein the recorded data to the tangible storage device includes at least date and time of the potential electrostatic discharge event.

13. The computing unit of claim 12, wherein the recorded data to the tangible storage device further comprises equipment serial number, type of equipment, make and model of the equipment and assessed damage to the equipment.

14. The computing unit of claim 7, wherein if a correlation exists between the potential electrostatic discharge and associated environmental factors event and the other electrostatic discharge events with associated environmental factors, an operator determining steps to minimize electrostatic discharge risks and electrostatic discharge events.

15. The computing unit of claim 7, wherein the individual hardware unit comprises the electrostatic discharge monitor.

16. A computer system for monitoring for electrostatic discharge events, the computer system comprising:
one or more processors, one or more computer-readable memories and one or more computer-readable, tangible storage devices;
program instructions, stored on at least one of the one or more storage devices for execution by at least one of the one or more processors via at least one of the one or more memories to monitor for potential of electrostatic discharge events and entry of an operator into a sensed area;
program instructions, stored on at least one of the one or more storage devices for execution by at least one of the one or more processors via at least one of the one or more memories wherein if an operator enters into the sensed area and an electrostatic discharge event is detected:
issue an electrostatic discharge event alert to the operator and recording data to a tangible storage device;
determine environmental factors at time and date of the potential electrostatic discharge event;
compare the potential electrostatic discharge event and associated environmental factors to other electrostatic discharge events with associated environmental factors; and
determine if a correlation exists between the potential electrostatic discharge event and associated environmental factors and the other electrostatic discharge events with associated environmental factors; and if the electrostatic discharge event is not detected by the computer upon entry of the operator into sensed area, program instructions, stored on at least one of the one or more storage devices for execution by at least one of the one or more processors via at least one of the one or more memories to issue an issue entry alert to the operator, reminding the operator to follow electrostatic discharge protocol and recording data of the entry alert to the tangible storage device.

17. The computer system of claim 16, wherein the environmental factors are selected from a group consisting of weather, weather patterns, humidity, temperature, and operators of equipment.

18. The computer system of claim 16, wherein the recorded data to the tangible storage device includes at least date and time of the potential electrostatic discharge event.

19. The computer system of claim 18, wherein the recorded data to the tangible storage device further comprises equipment serial number, type of equipment, make and model of the equipment and assessed damage to the equipment.

20. The computer system of claim 16, wherein if a correlation exists is determined between the potential electrostatic discharge event and associated environmental factors and the other electrostatic discharge events with associated environmental factors, the system further comprises an operator determining steps to minimize electrostatic discharge risks and electrostatic discharge events.

21. A computer program product for monitoring for electrostatic discharge events, the computer program product comprising:
one or more computer-readable, tangible storage devices;
program instructions, stored on at least one of the one or more storage devices, to monitor for potential of electrostatic discharge events and entry of an operator into a sensed area;
program instructions, stored on at least one of the one or more storage devices, wherein if an operator enters into the sensed area and an electrostatic discharge event is detected:
issue an electrostatic discharge event alert to the operator and recording data to a tangible storage device;
determine environmental factors at time and date of the potential electrostatic discharge event;
compare the potential electrostatic discharge event and associated environmental factors to other electrostatic discharge events with associated environmental factors; and
determine if a correlation exists between the potential electrostatic discharge event and associated environmental factors and the other electrostatic discharge events with associated environmental factors; and
if the electrostatic discharge event is not detected by the computer upon entry of the operator into sensed area, program instructions, stored on at least one of the one or more storage devices, to issue an issue entry alert to the operator, reminding the operator to follow electrostatic discharge protocol and recording data of the entry alert to the tangible storage device.

22. The computer program product of claim 21, wherein the environmental factors are selected from a group consisting of weather, weather patterns, humidity, temperature, and operators of equipment.

23. The computer program product of claim 21, wherein the recorded data to the tangible storage device includes at least date and time of the potential electrostatic discharge event.

24. The computer program product of claim 23, wherein the recorded data to the tangible storage device further comprises equipment serial number, type of equipment, make and model of the equipment and assessed damage to equipment.

25. The computer program product of claim 21, wherein if a correlation exists is determined between the potential electrostatic discharge event and associated environmental factors and the other electrostatic discharge events with associated environmental factors, the system further comprises an operator determining steps to minimize electrostatic discharge risks and electrostatic discharge events.

* * * * *